United States Patent
Ito et al.

(10) Patent No.: US 7,618,719 B2
(45) Date of Patent: Nov. 17, 2009

(54) HARD COATING FOR GLASS MOLDING AND GLASS MOLDING DIE HAVING THE HARD COATING

(75) Inventors: Hirotaka Ito, Kobe (JP); Kenji Yamamoto, Kobe (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 560 days.

(21) Appl. No.: 11/555,904

(22) Filed: Nov. 2, 2006

(65) Prior Publication Data
US 2007/0164399 A1    Jul. 19, 2007

(30) Foreign Application Priority Data
Jan. 13, 2006    (JP)    ............... 2006-006228

(51) Int. Cl.
*C03B 11/00*    (2006.01)
(52) U.S. Cl. ................... 428/697; 65/374.1; 65/374.11; 249/134; 428/336; 428/698; 428/699; 428/704
(58) Field of Classification Search .................. 51/307, 51/309; 428/336, 697, 698, 699, 704; 65/374.1, 65/374.11; 249/134
See application file for complete search history.

(56) References Cited

U.S. PATENT DOCUMENTS

| | | | | |
|---|---|---|---|---|
| 4,239,536 A | * | 12/1980 | Yamamoto et al. | 428/380 |
| 4,746,563 A | * | 5/1988 | Nakano et al. | 428/698 |
| 5,723,174 A | * | 3/1998 | Sato | 427/133 |
| 5,915,162 A | * | 6/1999 | Uchino et al. | 428/699 |
| 6,146,697 A | * | 11/2000 | Undercoffer | 407/119 |
| 6,586,122 B2 | * | 7/2003 | Ishikawa et al. | 428/698 |
| 7,087,295 B2 | * | 8/2006 | Okada et al. | 428/336 |
| 7,226,670 B2 | * | 6/2007 | Derflinger et al. | 428/699 |
| 7,258,912 B2 | * | 8/2007 | Yamamoto et al. | 428/697 |
| 7,366,395 B2 | * | 4/2008 | Yuasa et al. | 385/147 |
| 2005/0144982 A1 | * | 7/2005 | Pai | 65/374.11 |
| 2006/0037363 A1 | * | 2/2006 | Wang | 65/374.11 |

FOREIGN PATENT DOCUMENTS

| | | | |
|---|---|---|---|
| JP | 2003-025113 | * | 1/2003 |
| JP | 2003-26429 | | 1/2003 |
| JP | 2003-89533 | | 3/2003 |
| JP | 2003-137565 | | 5/2003 |

\* cited by examiner

*Primary Examiner*—Archene Turner
(74) *Attorney, Agent, or Firm*—Oblon, Spivak, McClelland, Maier & Neustadt, L.L.P.

(57) ABSTRACT

A hard coating combining excellent mold releasability with respect to glass with excellent durability at high temperature environment of 600° C. or more, and a glass molding die having the hard coating are provided. A glass molding die has a hard coating formed on a molding surface of a base. The hard coating includes one or two of W and V, and B, C and N; wherein when a composition of the coating is expressed as $W_{a1}V_{a2}B_bC_cN_d$, $0.1 \leq a1+a2 \leq 0.5$, $0.05 \leq b \leq 0.5$, $0.02 \leq c \leq 0.15$, $0.05 \leq d \leq 0.5$, and $a1+a2+b+c+d=1$ are given. The hard coating can be formed on the molding surface of the base via an intermediate layer including an amorphous CrSiN film.

6 Claims, 1 Drawing Sheet

HARD COATING FOR GLASS MOLDING AND GLASS MOLDING DIE HAVING THE HARD COATING

BACKGROUND OF THE INVENTION

1. Field of the Invention

The present invention relates to a hard coating that is used for a glass molding die, and has excellent mold releasability with respect to glass after high-temperature molding, and a glass molding die having the coating.

2. Description of Related Art

In a molding die for a glass molded component such as a glass lens, improvement in mold releasability of glass has been investigated by covering a molding surface of a die base with a diamond-like carbon film (DLC film) or a noble metal series coating. For example, patent literature 1 describes a glass molding die having a transparent carbon film on a surface of a die base, the film having a carbon content of 95 at % or more, and Knoop hardness number in a range of 3000 to 7000. Patent literature 2 describes a glass molding die formed with a DLC film of which the density is changed continuously or stepwise. Patent literature 3 describes a fact that a molding surface of a base is covered with a protective film including any one of metals or metal alloys of Pt, Ir, W, Re, Ta, Rh, Ru, and Os, thereby durability and stability of a die are improved.

[Patent Literature 1]
JP-A No. 2003-89533.
[Patent Literature 2]
JP-A No. 2003-137565.
[Patent Literature 3]
JP-A No. 2003-26429.

SUMMARY OF THE INVENTION

However, while the patent literature 1 describes that the transparent carbon film composed with the carbon content of 95 at % or more does not show any change in coating hardness after keeping the film at 600° C. for 2 hours, the literature does not show glass molding temperature in an example of glass lens molding, consequently it does not clearly describe mold releasability in glass molding at 600° C. or more. Moreover, since the DLC film transforms into graphite carbon at high temperature of 600° C. or more, it is hardly proof against use at high-temperature environment. Moreover, while the DLC film disclosed in the patent literature 2 exhibits durability in a lens molding test at 580° C. according to a glass mold method, it may still not stand use at high temperature of 600° C. or more, because it is also a DLC film. Moreover, in the case of the protective film including any one of metals or metal alloys of Pt, Ir, W, Re, Ta, Rh, Ru, and Os described in the cited literature 3, mold releasability of the glass lens is reduced at high temperature. In addition, the metal forming the film is expensive, resulting in increase in material cost.

It is desirable to provide a hard coating having excellent mold releasability with respect to glass in molding at high temperature of 600° C. or more, and a glass molding die having the hard coating.

A hard coating of an embodiment of the invention is a hard coating formed on a molding surface of a base of a glass molding die, and includes one or two of W and V, and B, C and N; wherein a composition of the coating is expressed as $W_{a1}V_{a2}B_bC_cN_d$, $0.1 \leq a1+a2 \leq 0.5$, $0.05 \leq b \leq 0.5$, $0.02 \leq c \leq 0.15$, $0.05 \leq d \leq 0.5$, and $a1+a2+b+c+d=1$ are given.

According to the hard coating for glass molding of the embodiment of the invention, one or two of W and V is added to B, C and N such that a predetermined ratio is given, thereby while making the most of the lubricating ability of a BCN film, increase in hardness of the coating can be achieved, and consequently, excellent mold release of glass is obtained even in high-temperature molding. That is, because the BCN film has BN bond, it is excellent in lubricating ability, mold releasability with respect to glass, and has moderate hardness, but the hardness is low compared with the DLC film. Since mold releasability is improved with increase in hardness of the coating, it is essential to achieve increase in hardness of the coating. Both nitrides formed by W and V have extremely high hardness, and one or two of W and V is added to B, C and N such that the predetermined ratio is given, thereby the BCN film can be increased in hardness, and thus the mold releasability with respect to glass of the glass molding die can be improved after high-temperature molding at 600° C. or more.

Moreover, the hard coating of the embodiment of the invention is the hard coating formed on the molding surface of the base of the glass molding die, and includes W, B, C and N, wherein when a Cu-kα line is used in X-ray diffraction measurement according to a θ-2θ method, half value width of an α-W (110) diffraction line in 2θ of 30° to 50° is within a range of 6.0° to 8.0°.

By adding W to BCN, hardness is more remarkably increased. As a factor concerning increase in hardness at that time, formation of an α-W solid solution can be given. When the Cu-kα line is used in X-ray diffraction measurement according to the θ-2θ method, in the case that W is not added, an amorphous structure is shown and a peak indicating crystallinity is not detected; however when W is added, the α-W (110) diffraction line appears, and hardness is increased. An angle at which the peak appears is in 2θ of 30° to 50°, and half value width of the line is within a range of 6.0° to 8.0°. Therefore, the hard coating of the embodiment of the invention can be specified from a measurement result of XRD as described above.

A glass molding die of the embodiment of the invention has the hard coating formed on the molding surface of the base, wherein the hard coating includes one or two of W and V added to B, C and N such that the predetermined ratio is given.

The hard coating preferably has thickness of 100 nm to 3000 nm. The hard coating can be formed on the molding surface of the base via an intermediate layer including an amorphous CrSiN film. Thus, adhesiveness of the hard coating to the base is improved, leading to excellent durability.

ADVANTAGE OF THE INVENTION

According to the hard coating for glass molding or the glass molding die having the coating of the embodiment of the invention, since the hard coating is provided, in which W and/or V is added to the BCN film such that a predetermined atomic ratio is given, mold releasability of glass is excellent after high-temperature molding at 600° C. or more. Moreover, the hard coating is formed on the base via the intermediate layer including the amorphous CrSiN film, thereby adhesiveness between the hard coating and the base is improved, leading to improved durability.

DESCRIPTION OF THE PREFERRED EMBODIMENT

Hereinafter, an embodiment of a hard coating and a glass molding die according to the invention are described with reference to drawings.

Figure 1:
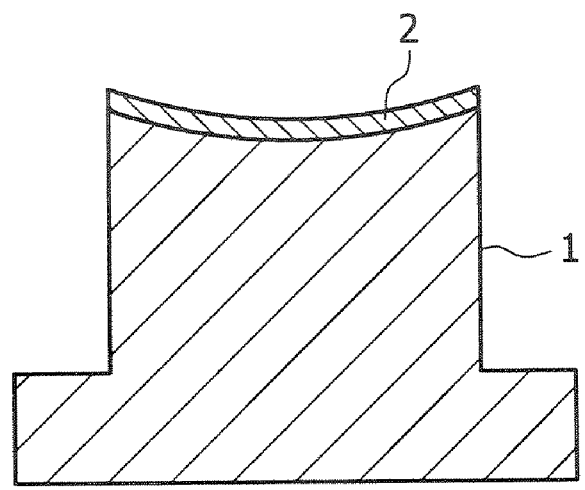
FIG. 1 is an explanatory sectional view of a glass molding die according to a first embodiment of the invention.

FIG. 1 shows a die for glass lens molding according to a first embodiment, wherein a hard coating 2 is formed on a lens molding surface of a base 1 in a covering manner. The hard coating 2 includes one or two of W and V, and B, C and N; wherein a composition of the coating is expressed as $W_{a1}V_{a2}B_bC_cN_d$, atomic composition ratios of respective elements a1, a2, b, c and d satisfy the following conditions:

$$0.1 \leq a1+a2 \leq 0.5, 0.05 \leq b \leq 0.5;$$

$$0.02 \leq c \leq 0.15, 0.05 \leq d \leq 0.5; \text{ and}$$

$$a1+a2+b+c+d=1.$$

Since each nitride formed by W or V has high hardness, at least one of W and V is added (W and/or V added in this way is expressed by "M") in addition to B, C and N, thereby hardness of BCN can be remarkably increased, the BCN having excellent lubricating ability and mold releasability with respect to glass. Regarding a composition of M, when (a1+a2) is less than 0.1, the hardness increasing effect is extremely small, therefore it is defined to be 0.1 or more, and preferably 0.30 or more. On the other hand, when M is excessively added, the nitrides are not formed, and hardness is rather decreased, therefore (a1+a2) is defined to be 0.5 or less, and preferably 0.4 or less. When W is singularly added, a2=0 is given, and when V is singularly added, a1=0 is given.

N is linked with W or V and thus forms a hard nitride. At a ratio of B to C described later, d, a ratio of N, is preferably in a range of 0.05 to 0.5. More preferably, it is 0.10 to 0.40.

B is linked with N and thus forms B-N bond in the coating, thereby improving mold releasability of glass by enhancing the lubricating ability of the coating. Furthermore, B is partially linked with W or V and thus forms a hard boride. When b, a ratio of B, is less than 0.05, such effects are extremely small, therefore a lower limit of b is defined to be 0.05, and preferably 0.25 or more. However, when B is excessively added, soft BN compounds are excessively formed, therefore an upper limit of the ratio b is defined to be 0.5, and preferably 0.45.

C is linked with W, V or B and thus forms a hard carbide, thereby contributing to increase in hardness. When c, a ratio of C, is less than 0.02, such an effect is extremely small. On the other hand, when the ratio is more than 0.15, free C that is not linked with M is formed, resulting in reduction in heat resistance. Therefore, a lower limit of the ratio c is defined to be 0.02, and preferably 0.03, and an upper limit is defined to be 0.15, and preferably 0.12.

As a factor concerning increase in hardness of the hard coating 2, formation of the α-W solid solution is given. The α-W solid solution is specified by the XRD measurement according to the θ-2θ method. That is, When the Cu-kα line is used, in the case that W is not added, the amorphous structure is shown and the peak indicating crystallinity is not detected; however when the α-W solid solution is formed by adding W, the α-W (110) diffraction line appears, and hardness is increased. An angle at which the peak appears is in 2θ of 30° to 50°, and half value width of the line is within a range of 6.0° to 8.0°.

Thickness of the hard coating is preferably 100 nm or more in the light of securing durability. However, when the thickness is excessively large, surface roughness is increased, reducing the mold releasability of glass. Therefore, an upper limit of the thickness is defined to be 3000 nm, and more desirably 1000 nm.

The base is formed of various steel materials such as machine structural carbon steel, structural alloy steel, tool steel, and stainless steel, or metal materials such as a sintered hard alloy, and an intermediate layer such as a plating layer or thermal spraying layer may be formed on a surface of the base. The hard coating is typically formed on the base by a sputtering process, however, various physical or chemical vapor deposition processes such as an ion plating process and a laser ablation process can be used for forming the hard coating.

Figure 2:
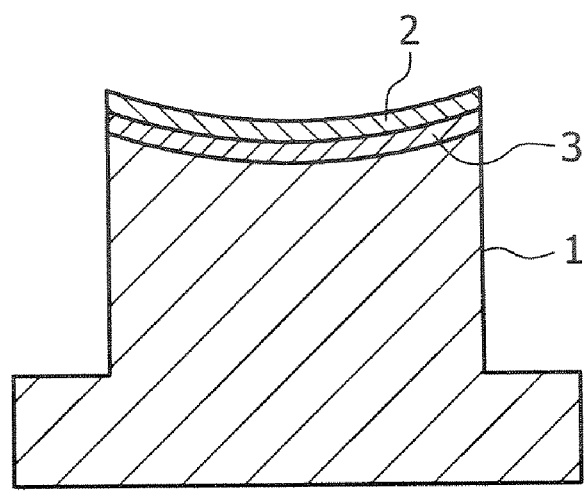
FIG. 2 is an explanatory sectional view of a glass molding die according to a second embodiment of the invention.

Next, a die for glass lens molding according to a second embodiment of the invention is described with reference to FIG. 2. The same members as those of the die for glass lens molding according to the first embodiment are marked with the same signs, and omitted to be described.

In the die according to the second embodiment, the hard coating 2 is formed on the base 1 in a covering manner via an intermediate layer 3 including an amorphous CrSiN film. By providing the intermediate layer 3, adhesiveness between the base 1 including a metal material, and the hard coating 2 can be improved. The CrSiN film is formed on a molding surface of the base 1 by the sputtering process or the like, and when it is in a composition of $(Si_xCr_{1-x})N$, and x=0.5 to 0.9 is given irrespectively of the amount of N, an amorphous structure is shown. When thickness of the film is less than 100 nm, the effect of improving adhesiveness is extremely small, therefore it is preferably 100 nm or more. However, when the thickness is excessively large, surface roughness is increased, reducing the mold releasability. Therefore, the thickness is desirably 3000 nm or less, and more desirably in a range of 500 nm to 1000 nm.

Hereinafter, the embodiment of the invention is described more specifically with examples, however, the embodiment of the invention is not interpreted to be limited to the examples.

EXAMPLE 1

Coatings having compositions as shown in Table 1 were formed on bases by using deposition apparatus having a sputter evaporation source with targets containing metal elements M and B respectively. The bases were formed of a sintered hard alloy, and coating formation surfaces were mirror-polished.

The hard coatings were formed according to the following procedure. A substrate was introduced into the apparatus, then the apparatus was evacuated to $1 \times 10^{-3}$ Pa or less, and then the base was heated to about 400° C., then subjected to sputter cleaning using Ar ions. In sputter deposition, a target 6 inches in diameter was used, and input power was set to be 2 kW at a side of the target containing B, and input power was varied in a range of 0.5 to 3.0 kW at a side of the target containing M, so that a composition was adjusted. In deposition, the deposition was carried out using a mixed gas of $Ar/N_2=65/35$, or a mixed gas of $Ar/N_2/CH_4$ when C was added, wherein the total pressure was 0.6 Pa. Thickness was fixed to about 1000 nm.

Hardness, a crystal structure, and mold releasability with respect to glass of the hard coatings were examined using the bases deposited with the hard coatings in the above way.

The hardness was measured using nanoindenter manufactured by Elionix Inc. (using Berkovich indenter). In XRD measurement, the θ-2θ measurement was carried out. Moreover, composition analysis was carried out with films deposited on Si substrates using EDX of SEM (manufactured by HITACHI, type S-3500N) A measurement condition was fixed to acceleration voltage of 20 kV, measurement magnification of ×2000, a working distance of 15 mm, and a lifetime of 60 sec.

Regarding the mold releasability of glass, a glass material is placed on the hard coatings on the bases, then heated to 600° C. in 30 min, and then kept at 600° C. for 1 hour, and then subjected to natural cooling, after that mold releasability of the glass material to the hard coatings was evaluated with the following four grades by an area ratio of remained glass (adhesion area) after removing the glass. That is, a sample where the glass was not remained on the sample at all was evaluated as ⊚, a sample where the glass was remained in 10% or less of an area in which the glass was placed on the sample was evaluated as ○, a sample where the glass was remained in 10% to 30% of an area in which the glass was placed on the sample was evaluated as Δ, and a sample where the glass was remained in more than 30% of an area in which the glass was placed on the sample was evaluated as x. Examination results of them are shown in Table 1 together.

From Table 1, it was confirmed that hard coatings of inventive examples (samples Nos. 4 to 8, 12 to 16, 20, 23, 25 and 26) had hardness equal to that of a DLC film of a sample No. 1 or more, and had mold releasability with respect to glass equal to that of a BCN film of a sample No. 2 or more. However, even in the MBCN film, in coatings of samples Nos. 3, 9 to 11, 17 to 19, 21, 22 and 24 having inadequate composition ratios of respective elements, the mold releasability with respect to glass was generally reduced.

2.0 kW at a side of the target containing Si. On the other hand, in sputter deposition of the hard coatings, a target 6 inches in diameter was used, and input power was set to be 2 kW at a side of the target containing B, and input power was set to be 2.0 kW at a side of the target containing M. In deposition, the deposition was carried out using a mixed gas of Ar/$N_2$=65/35, or a mixed gas of Ar/$N_2$/$CH_4$ when C was added, wherein the total pressure was 0.6 Pa. Thickness of the intermediate layers was varied in a range of 50 to 5000 nm, and thickness of the hard coatings was also varied in the same range.

A composition, hardness, a separation property to a base, and mold releasability with respect to glass of the hard coatings were examined using the bases deposited with the intermediate layers and the hard coatings in the above way. The composition, hardness, and mold releasability were measured

TABLE 1

| Sample No. | Coating composition (ratio) | | | | | Hardness (GPa) | α-W(110) Peak position 2θ(°) | α-W(110) Half value width of peak 2θ(°) | Releasability of glass |
|---|---|---|---|---|---|---|---|---|---|
| | V | W | B | C | N | | | | |
| *1 | | | (DLC film) | | | 15 | — | — | X |
| *2 | 0 | 0 | 0.45 | 0.15 | 0.4 | 10 | — | — | Δ |
| *3 | 0.03 | 0 | 0.5 | 0.12 | 0.35 | 15 | — | — | Δ |
| 4 | 0.15 | 0 | 0.46 | 0.1 | 0.29 | 15 | — | — | ○ |
| 5 | 0.22 | 0 | 0.43 | 0.05 | 0.3 | 23 | — | — | ○ |
| 6 | 0.31 | 0 | 0.4 | 0.05 | 0.24 | 24 | — | — | ○ |
| 7 | 0.35 | 0 | 0.42 | 0.05 | 0.18 | 25 | — | — | ○ |
| 8 | 0.4 | 0 | 0.4 | 0.05 | 0.15 | 26 | — | — | ○ |
| *9 | 0.54 | 0 | 0.36 | 0.05 | 0.05 | 25 | — | — | Δ |
| *10 | 0.63 | 0 | 0.28 | 0.05 | 0.04 | 12 | — | — | X |
| *11 | 0 | 0.05 | 0.53 | 0.1 | 0.32 | 14 | — | — | Δ |
| 12 | 0 | 0.16 | 0.5 | 0.09 | 0.25 | 19 | 37 | 6.5 | ○ |
| 13 | 0 | 0.25 | 0.46 | 0.05 | 0.24 | 23 | 37.4 | 7.2 | ○ |
| 14 | 0 | 0.32 | 0.43 | 0.07 | 0.18 | 30 | 37.6 | 7.3 | ⊚ |
| 15 | 0 | 0.4 | 0.43 | 0.07 | 0.1 | 32 | 37.7 | 7.5 | ⊚ |
| 16 | 0 | 0.46 | 0.4 | 0.05 | 0.09 | 29 | 38.5 | 7.4 | ○ |
| *17 | 0 | 0.52 | 0.33 | 0.05 | 0.1 | 28 | 39.2 | 7.6 | Δ |
| *18 | 0 | 0.64 | 0.28 | 0.05 | 0.03 | 20 | 39.8 | 7.5 | X |
| *19 | 0 | 0.39 | 0.02 | 0.14 | 0.45 | 12 | — | — | Δ |
| 20 | 0 | 0.4 | 0.4 | 0.05 | 0.15 | 26 | 37.1 | 8.6 | ⊚ |
| *21 | 0 | 0.38 | 0.2 | 0.01 | 0.41 | 14 | 38.2 | 6.8 | Δ |
| *22 | 0 | 0.35 | 0.16 | 0.19 | 0.3 | 15 | 37.8 | 7.1 | Δ |
| 23 | 0 | 0.39 | 0.31 | 0.14 | 0.16 | 25 | 38.2 | 7.3 | ○ |
| *24 | 0 | 0.35 | 0.08 | 0.04 | 0.53 | 14 | 37.7 | 7.9 | Δ |
| 25 | 0.24 | 0.1 | 0.25 | 0.05 | 0.36 | 24 | 37.5 | 7.2 | ⊚ |
| 26 | 0.16 | 0.2 | 0.21 | 0.05 | 0.38 | 27 | 37.8 | 7.4 | ○ |

Note:
Sample No. marked with an asterisk is a comparative example.
Numerals with an underline are without scope of the invention.

EXAMPLE 2

Intermediate layers having compositions as shown in Table 2 were formed on mirror-polished, sintered hard alloy bases by using deposition apparatus having a sputter evaporation source with a Cr target and a Si target. Furthermore, coatings as shown in the table were formed on the intermediate layers by using deposition apparatus having a sputter evaporation source with targets containing metal elements M and B respectively.

The intermediate layers and the hard coatings were formed according to the following procedure. A substrate was introduced into the apparatus, then the apparatus was evacuated to $1 \times 10^{-3}$ Pa or less, then the base was heated to about 400° C., and then subjected to sputter cleaning using Ar ions. In sputter deposition of the intermediate layers, a target 6 inches in diameter was used, and input power was set to be 0.2 kW at a side of the target containing Cr, and input power was set to be and evaluated similarly as in the example 1. The film separation property was evaluated in a way that a scratch test was carried out using a diamond indenter 200 μm in radius in a condition of a load range of 0 to 100 N, scratch speed of 1.0 cm/min, and load speed of 100 N/min, and load at which the film was completely separated was assumed to be $L_c2$. Examination results of them are shown in Table 2 together.

From Table 2, hard coatings of samples Nos. 1 to 16 (all are inventive examples) generally have hardness equal to that of the DLC film (sample No. 1 in Table 1) or more, and have excellent mold releasability with respect to glass. However, a sample No. 7 has slightly inferior mold releasability with respect to glass because thickness of the hard coating is large, at 5000 nm. A sample No. 8 did not exhibit improvement in film separation property due to the intermediate layer because the intermediate layer is extremely thin, at 50 nm.

TABLE 2

| Sample No. | Intermediate layer Composition (ratio) | | | Thickness (nm) | Hard coating Composition (ratio) | | | | | Thickness (nm) | Hardness (GPa) | Film separation property Lc2 (N) | Releasability of glass |
|---|---|---|---|---|---|---|---|---|---|---|---|---|---|
| | Cr | Si | N | | V | W | B | C | N | | | | |
| 1 | — | — | — | — | — | 0.4 | 0.4 | 0.1 | 0.1 | 50 | 17 | 60 | ○ |
| 2 | — | — | — | — | — | 0.4 | 0.4 | 0.1 | 0.1 | 100 | 29 | 75 | ⊚ |
| 3 | — | — | — | — | — | 0.4 | 0.4 | 0.1 | 0.1 | 300 | 30 | 80 | ⊚ |
| 4 | — | — | — | — | — | 0.4 | 0.4 | 0.1 | 0.1 | 500 | 30 | 84 | ⊚ |
| 5 | — | — | — | — | — | 0.4 | 0.4 | 0.1 | 0.1 | 1000 | 29 | 84 | ⊚ |
| 6 | — | — | — | — | — | 0.4 | 0.4 | 0.1 | 0.1 | 3000 | 30 | 76 | ○ |
| 7 | — | — | — | — | — | 0.4 | 0.4 | 0.1 | 0.1 | 5000 | 28 | 67 | Δ |
| 8 | 0.09 | 0.36 | 0.55 | 50 | — | 0.4 | 0.4 | 0.1 | 0.1 | 100 | 27 | 65 | Δ |
| 9 | 0.09 | 0.36 | 0.55 | 100 | — | 0.4 | 0.4 | 0.1 | 0.1 | 100 | 29 | 97 | ⊚ |
| 10 | 0.09 | 0.36 | 0.55 | 300 | — | 0.4 | 0.4 | 0.1 | 0.1 | 100 | 27 | 91 | ⊚ |
| 11 | 0.09 | 0.36 | 0.55 | 500 | — | 0.4 | 0.4 | 0.1 | 0.1 | 100 | 28 | >100 | ⊚ |
| 12 | 0.09 | 0.36 | 0.55 | 1000 | — | 0.4 | 0.4 | 0.1 | 0.1 | 100 | 29 | >100 | ⊚ |
| 13 | 0.09 | 0.36 | 0.55 | 3000 | — | 0.4 | 0.4 | 0.1 | 0.1 | 100 | 29 | 90 | ⊚ |
| 14 | 0.09 | 0.36 | 0.55 | 5000 | — | 0.4 | 0.4 | 0.1 | 0.1 | 100 | 29 | 75 | ○ |
| 15 | 0.09 | 0.36 | 0.55 | 1000 | 0.4 | — | 0.4 | 0.1 | 0.1 | 100 | 26 | >100 | ○ |
| 16 | 0.09 | 0.36 | 0.55 | 1000 | 0.2 | 0.2 | 0.4 | 0.1 | 0.1 | 100 | 31 | >100 | ⊚ |

Note:
Samples Nos. 1 to 16 are inventive examples.

What is claimed is:

1. A hard coating for glass molding, which is formed on a molding surface of a base of a glass molding die, comprising:
one or two of W and V, and B, C and N;
wherein when a composition of the coating is expressed as $W_{a1}V_{a2}B_bC_cN_d$,
$0.1 \leq a1+a2 \leq 0.5$, $0.05 \leq b \leq 0.5$,
$0.02 \leq c \leq 0.15$, $0.05 \leq d \leq 0.5$, and
$a1+a2+b+c+d=1$ are given.

2. The hard coating for glass molding according to claim 1:
wherein when a Cu-kα line is used in X-ray diffraction measurement according to a θ-2θ method, half value width of an α-W (110) diffraction line in 2θ of 30° to 50° is within a range of 6.0° to 8.0°.

3. A glass molding die having a hard coating formed on a molding surface of a base:
wherein the hard coating is formed of the hard coating for glass molding according to claim 1 or 2.

4. The glass molding die according to claim 3:
wherein the hard coating preferably has thickness of 100 nm to 3000 nm.

5. The glass molding die according to claim 3:
wherein the hard coating is formed on the molding surface of the base via an intermediate layer including an amorphous CrSiN film.

6. The glass molding die according to claim 4:
wherein the hard coating is formed on the molding surface of the base via an intermediate layer including an amorphous CrSiN film.

* * * * *